Oct. 21, 1930.  J. CAVANAGH  1,779,368
METHOD OF CAUSING ARTICLES TO ADHERE TO ONE ANOTHER
Filed Oct. 14, 1925   4 Sheets-Sheet 3

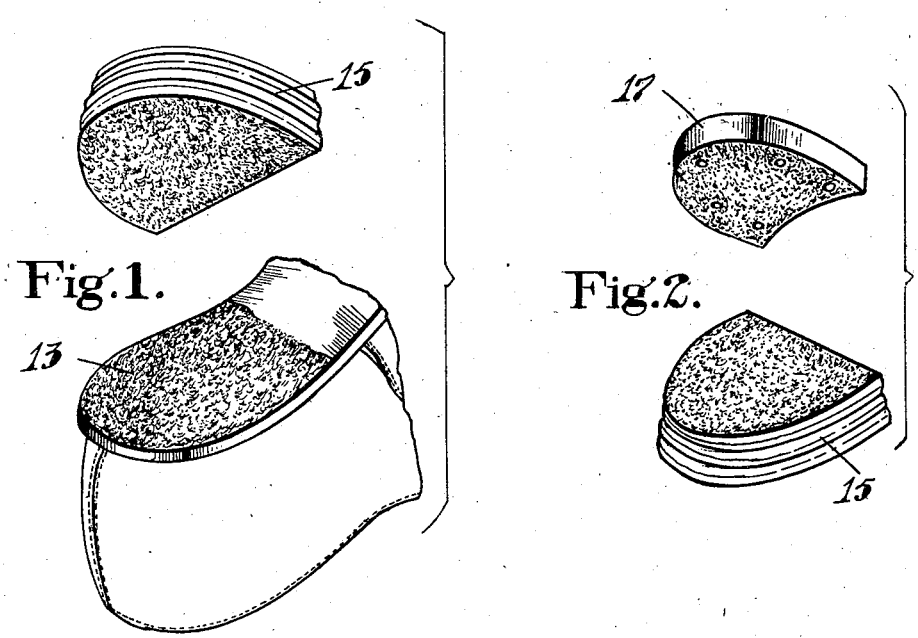
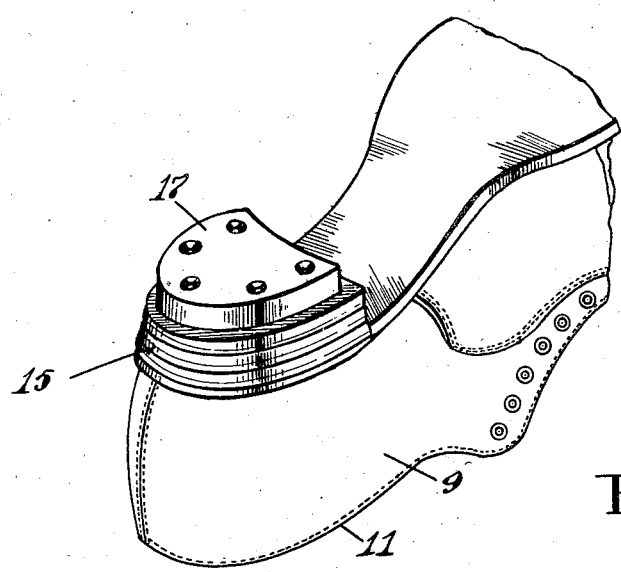

INVENTOR.
James Cavanagh
By his Attorney,
Nelson N. Howard

Oct. 21, 1930.   J. CAVANAGH   1,779,368
METHOD OF CAUSING ARTICLES TO ADHERE TO ONE ANOTHER
Filed Oct. 14, 1925   4 Sheets-Sheet 4

INVENTOR
James Cavanagh
By his Attorney,
Nelson W. Howard

Patented Oct. 21, 1930

1,779,368

UNITED STATES PATENT OFFICE

JAMES CAVANAGH, OF COHASSET, MASSACHUSETTS, ASSIGNOR TO UNITED SHOE MACHINERY CORPORATION, OF PATERSON, NEW JERSEY, A CORPORATION OF NEW JERSEY

METHOD OF CAUSING ARTICLES TO ADHERE TO ONE ANOTHER

Application filed October 14, 1925. Serial No. 62,487.

This invention relates to methods of handling articles and of causing them to adhere to one another, and is herein disclosed in connection with the handling and cementing together of certain articles used in the manufacture of boots and shoes.

In many of the operations which are carried out in the manufacture of boots and shoes, cement of one kind or another is used to attach certain parts to each other. These operations are usually carried out in one of three ways. (1) One or both surfaces of one of the articles which are to be caused to adhere to each other is given a coat of cement, and then the articles are pressed together while the cement is wet and held forcibly in contact until the cement has set. (2) Both articles are coated with cement on the two surfaces which are to be caused to adhere to each other, allowed to stand for an interval until the desired tackiness develops in the cement and then pressed together. (3) The articles are coated on two surfaces, as just recited, and allowed to stand until the coatings are dry, after which the coatings are softened by application of heat or a solvent to make them tacky, whereupon the articles are pressed together.

The methods which have been recited above necessitate certain disadvantageous procedures, examples of which are the following. In the method in which the articles are pressed together while the cement (for example, paste) is wet, the pressing must take place immediately subsequent to the application of the cement and must be continued until the cement has set. In the method in which the cement (for example rubber cement) is permitted to dry somewhat, until the desired tackiness appears, the pressing must take place during an interval which is fixed between rather narrow limits. In the method in which the cement (for example gutta-percha) is allowed to stand until it becomes dry, a resoftening operation must be performed. Viewing the matter broadly, there are at least two disadvantages, either the time at which the pressing must take place is fixed so that the operator cannot choose his own most convenient time to do the pressing, or else some sort of a resoftening operation must be performed on the dried coating of cement.

There are performed in the manufacture of boots and shoes a large number of cementing operations most of which have fallen within the methods numbered (1) and (2) in which either the pressing must take place immediately after the cement is applied and continued until the cement has set or cannot take place until after the cemented articles have stood for an interval but not long enough for the cement to become dry. In many cases it would be more convenient for the operator and more economical of his time if the articles could be coated one after another and allowed to stand for a more or less indefinite interval, which might be several days or even weeks, before they were assembled and pressed together. This is possible, of course, in those cases where a cement, which is capable of being softened, can be used; but the time and labor consumed by the resoftening operation usually more than offsets what is gained by such a procedure.

I have found that when the surfaces of articles such as shoe parts are coated with water-dispersed rubber such as rubber latex and the articles are allowed to stand for a more or less indefinite interval until the coated surfaces are dry, such articles may still be caused to adhere firmly to one another by superposing them with their coated surfaces in contact and pressing them together with considerable force, for example a force of several hundred pounds or more. In this connection it should be noted, as will presently appear, that two such articles may be caused to adhere lightly by using a moderate pressure and that this capability may conveniently be made use of, for example, in certain cases in which it is desired to cause a plurality of articles to adhere temporarily so that they may be handled as a unit preparatory to uniting them firmly. I have found further that the coating of rubber latex will dry in a very short interval, the interval depending somewhat upon the material of which the article is made so that the coated articles, shortly after having been coated, may be thrown indiscriminately into a receptacle and allowed to remain in contact with one another without becoming stuck together or at least without becoming stuck together to a degree sufficient to interfere with picking them up, rearranging them into composite units, stacking and feeding them from stacks, or applying them to other previously coated articles preparatory to applying the required degree of pressure necessary to cause the desired adhesion.

When rubber latex is used in this manner, it will be clear that the disadvantages previously referred to, which formerly attended the sticking together of shoe parts and similar articles, have been obviated. It is not necessary to press the articles together immediately after they have been coated, as has been the case when paste was used, nor to wait until the coated surfaces become properly tacky and then to press the articles together during the comparatively short interval during which the tackiness persists, as has been the case when rubber cement was used, so that the operator can choose the most convenient time for pressing the coated parts together. Moreover, it is not necessary to soften the dried coating with heat or a solvent preparatory to the pressing operation as has been necessary with cements of the gutta-percha type.

This discovery that articles coated with rubber latex can be allowed to stand until their coated surfaces are dry without losing their capability of being caused to adhere to one another obviously makes possible new procedures in the handling of articles which are to be cemented together; and several advantageous procedures in the art of making boots and shoes will now be described by way of illustration.

Referring now to the accompanying drawings:—

Figure 1 shows in perspective the rear portion of a shoe substantially complete except for the heel, and a heel base, the surface of the heel seat of the sole and the heel seat surface of the heel base having been coated with rubber latex and allowed to dry;

Figure 2 shows in perspective a rubber heel and a heel base similarly coated;

Figure 3 shows in perspective a portion of a shoe with a rubber heel and its base after the nailing operation;

Figure 4:
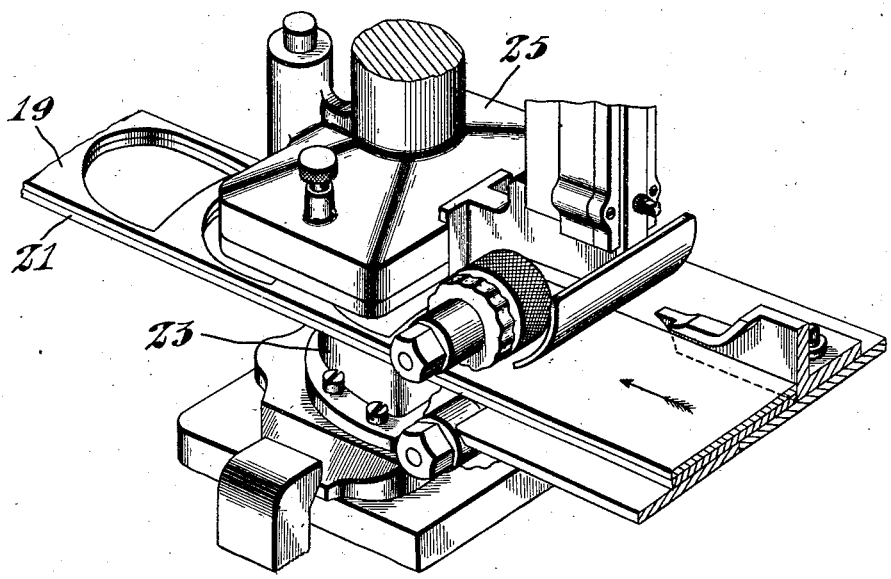
Figure 4 is a perspective of a portion of a heel-lift cutting machine and two superposed sheets of leather-board in process of being operated upon.

Referring first to Figures 1, 2 and 3, when rubber heels are attached to shoes, it is customary to provide a leather or leather-board base; and in order that the rubber heel and its base may be nailed to the heel portion of the sole of the shoe in a single operation, it is desirable either to attach the base to the sole or the rubber heel to the base prior to the operation of the nailing machine. In Figure 1 the heel portion of a shoe 9 is shown on the usual last 11, the heel seat portion of the sole 13 having been coated with rubber latex and allowed to dry. Above the shoe 9 is shown a heel base 15 made of a plurality of leather-board lifts, the heel-seat face of the base also having been coated with rubber latex and allowed to dry. The heel base may now be properly located upon the heel-seat portion of the sole and hammered or otherwise pressed against the sole with considerable force to cause the base and sole to adhere to each other. Thereafter the shoe with the heel base thus attached may be placed upon the jack of a nailing machine and the rubber heel 17 and the heel base nailed to the sole, or, instead of carrying out the procedure outlined above, the rubber heel 17 and the heel base 15 may be coated on their adjacent faces as indicated in Figure 2 and then pressed together. In this procedure, the rubber heel and the base thus become a unit which is attached to the sole of the shoe in the nailing operation. In either case the shoe with the rubber heel and the base nailed in place appears as in Figure 3. In performing either of the cementing operations referred to above, it is desirable that the surfaces to be coated be buffed or otherwise roughened.

An advantage of using either of these two procedures is that the articles may be coated at different times and in different parts of the factory, if desired, and allowed to stand for different and indefinite intervals before they are assembled and pressed together.

Referring now to Figure 4, there are shown two superposed sheets of leather-board 19, 21 which are being fed intermittently over the heel-lift die 23 of a lift cutting machine and intermittently acted upon by a vertically reciprocating platen 25 to cause rubber-heel base lifts to be died out of the sheets. The contacting faces of these sheets were coated with latex before the sheets were superposed; and the pressure exerted by the edge of the cutting die 23 acts to cause the two lifts, which are cut out at each reciprocation of the platen 25, to stick together in the locality of their registering edges sufficiently to hold the pairs of lifts together until they can be transferred to a compressing machine, where pressure is exerted upon each pair sufficient to cause the whole of their contacting surfaces to adhere with great firmness.

Figure 5:
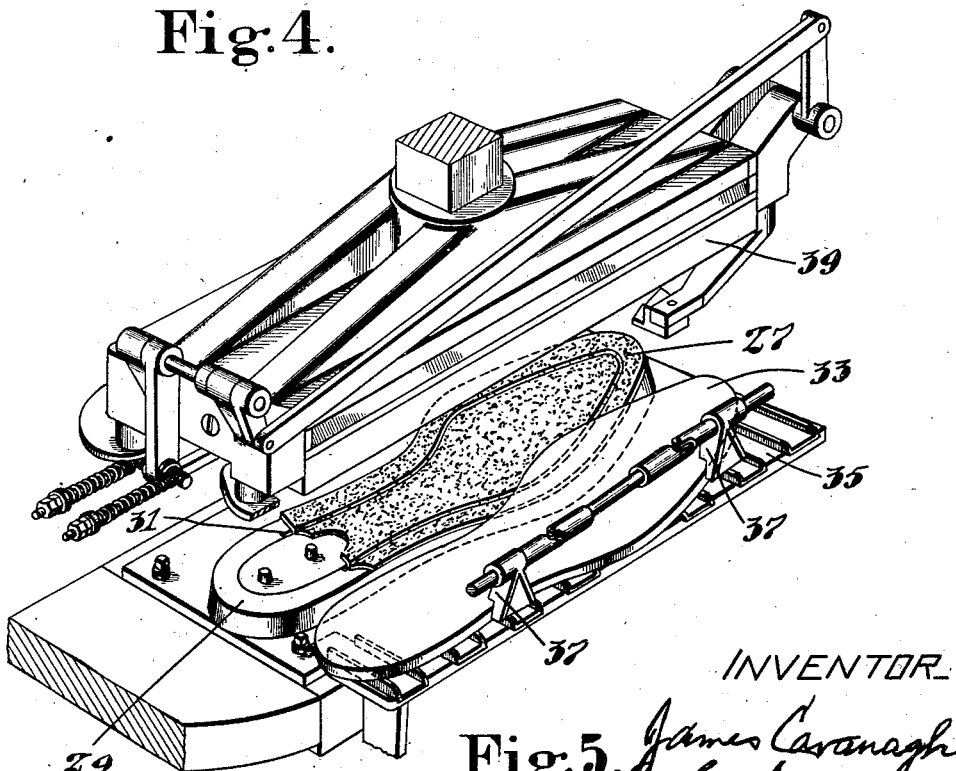
Figure 5 is a perspective of a portion of a machine for making a composite insole from a leather blank and a fabric blank, two such blanks being in process of being superposed.

In Figure 5 there is shown a portion of a machine for making a laminated insole, the particular insole shown being a canvas-covered welt insole. The illustrated machine is a turret machine having a plurality of stations, only one of which is shown. At the preceding station a canvas blank 27 carrying a dry coat of latex was placed upon a form 29 and a rib molded on the fabric blank by tucking a portion of the blank into a properly shaped slot 31 provided in the form 29. The turret carrying the form was then rotated to bring it to the station shown. At this station is a magazine (not shown) for a stack of leather blanks, one of which is shown at 33, each having on its under side a coat of dried latex. The blank 33 has been fed by a feed slide upon a ribbed plate 35 and is being slid into place upon the canvas blank 27 by pushers 37. After the leather blank has been superposed upon the canvas blank, a platen 39 descends to press the blanks together with considerable force. The feeding of the coated leather blanks from a stack in a magazine, the sliding of the coated face of the leather blank over the similarly coated face of the canvas blank and the subsequent union of the blanks by pressure is made possible by reason of the capability which rubber latex possesses of forming a strong bond under pressure even after it has dried to a condition in which it is not viscid.

Figure 6:
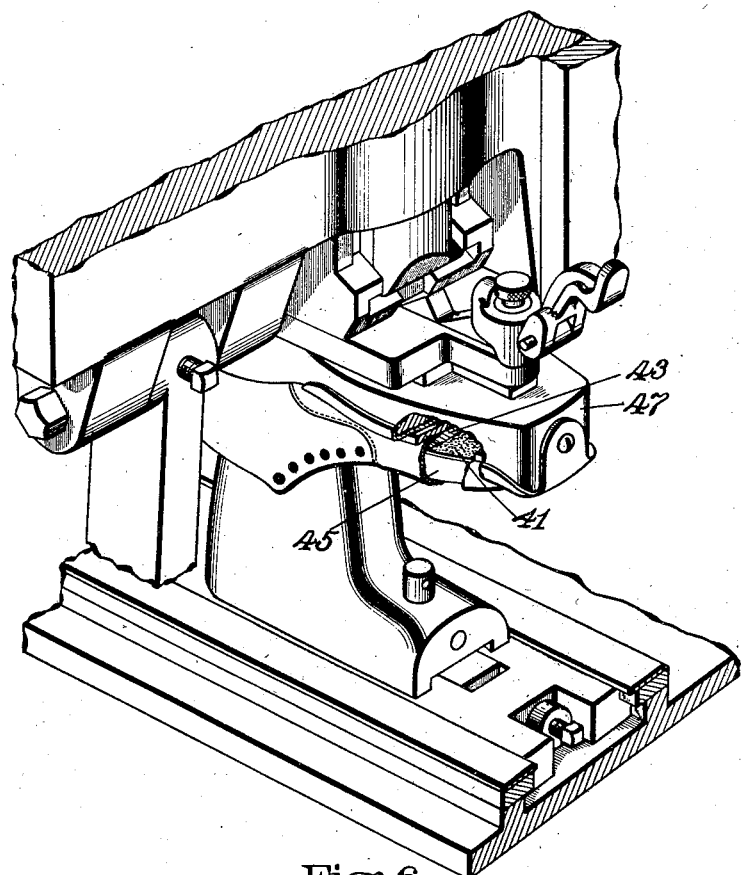
Figure 6 is a perspective of a portion of a sole leveling machine showing more particularly the pressing into place of a sock lining during the leveling operation.

Figure 6 shows the pressing of a sock lining 41 against the insole 43 of a McKay shoe during a sole leveling operation. Preparatory to this pressing operation a plurality of sock linings may be coated with latex, allowed to dry and placed in a convenient receptacle near the leveling machine, and the insoles of a plurality of shoes may be similarly coated and allowed to dry. The leveling operator then places a sock lining, coated side up, upon the bottom of the jack 45, places the shoe upon the jack with the coated surface of the insole in contact with the coated surface of the sock lining and causes the presser 47 to descend so that, simultaneously with the leveling of the outsole, the sock lining is pressed firmly against the insole. In this procedure, not only is the advantage obtained of permitting the sock linings and the insoles to be coated at different times and places if desired, and to stand for different and indeterminate intervals, but the laying of the sock lining as a separate operation, heretofore necessary, is obviated.

Figure 7:
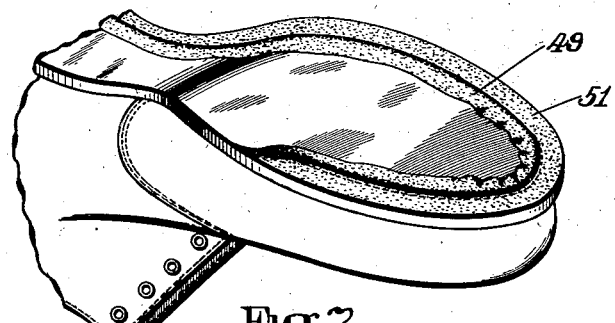
Figure 7 is a perspective of a shoe showing more particularly the treatment of the channel flap of the sole.

In Figure 7 is shown a shoe in which the channel flap 49 and the margin 51 of the sole have been coated with latex, and part of the channel flap laid by pressing it upon the adjacent portion of the margin of the sole. Here again the fact that the latex may be allowed to stand for an indefinite interval and still be capable of causing firm adhesion when the coated parts are pressed together with considerable force is of advantage because the operator is not required to perform the pressing operation at any fixed time.

Figure 8:
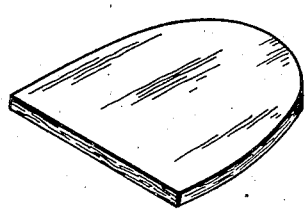
Figures 8 to 12 show several stages in the manufacture of a heel.
Figure 9:
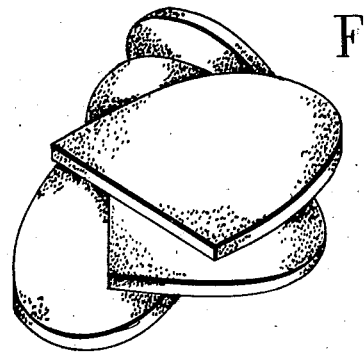
Figure 10:
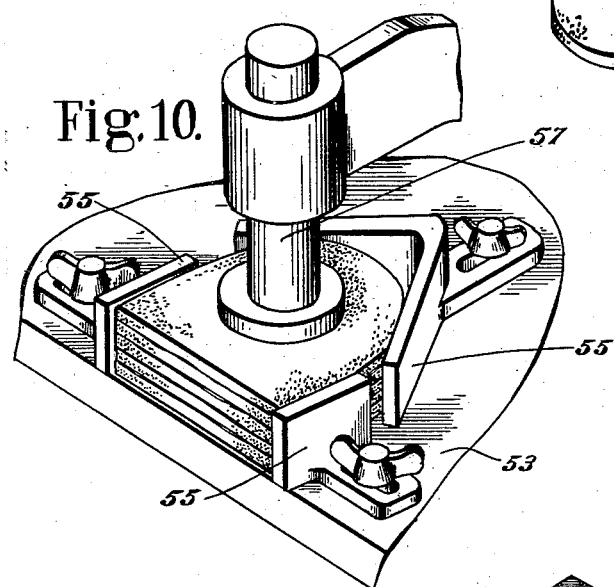
Figure 12:
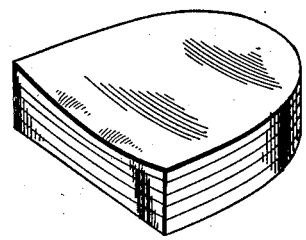
Figure 11:
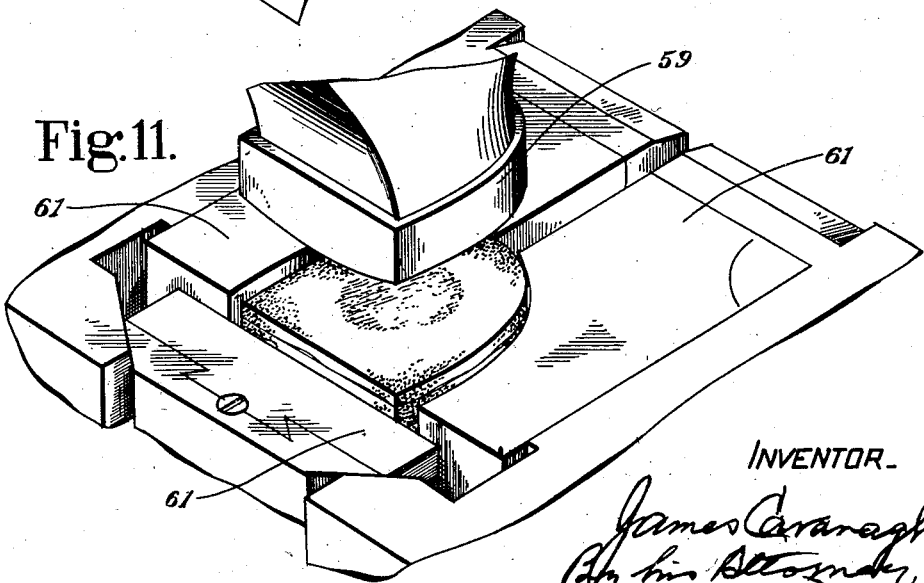

In Figures 8 to 12 are illustrated several stages in the manufacture of a heel and part of the apparatus which may be used in such manufacture. As herein exemplified, in the manufacture of the heel the lifts, one of which is shown in Figure 8, are coated on both sides with rubber latex, allowed to dry for an interval and thrown or otherwise delivered indiscriminately into receptacles of such size that they may be readily transported about the factory, the indiscriminate arrangement of the lifts being shown in Figure 9. Owing to the fact that the latex coating is dry, these lifts will not stick to one another or at least will not stick together to a degree sufficient to prevent them from being readily picked up individually and rearranged into composite units. After any desired number of lifts—advantageously enough to comprise several days' supply—have been thus treated and collected, the heel building and compressing operations may be carried out. Referring to Figure 10, the requisite number of lifts are placed in superposed relation upon a table 53 between guides 55 and pressed together, as illustrated by a hammer 57, with sufficient force to cause the lifts to hold together lightly until they are transferred to the compressor shown in Figure 11 where they are subjected to heavy pressure commonly amounting to several tons to the square inch between the die 59 and the sectional mold 61. The finished heel is shown in Figure 12. Besides the manufacturing advantage which is gained by reason of the possibility of preparing a supply of coated lifts in advance and keeping them on hand until they are made into heels, it should be noted that the firm holding quality of the cement makes possible the production of a heel which will not check at the joints.

In addition to the advantages which have been pointed out above, rubber latex possesses the further advantages that it produces a substantially waterproof joint; that, because of its aqueous vehicle, it penetrates leather and similar materials more thoroughly than does rubber cement, and that it is effective on greasy leather, such for example as viscolized leather to which rubber cement will scarcely adhere.

Throughout the specification the term "rubber latex" has been used in order to promote brevity. Commercial rubber latex is essentially an aqueous dispersion of rubber of which the rubber content is commonly from 33 to 38 per cent by weight. Commercial rubber latex may be used undiluted in case a particularly strong bond is required between two articles but for most purposes the latex may be diluted to a considerable extent. Just what is the limit of dilution I am unable to state beyond noting that in some operations, the rubber latex may be diluted by the addition to it of as much as three times its volume of water. It should be understood, therefore, that the particular rubber content of the latex used is immaterial so long as it is sufficient to produce a bond of the requisite strength. It should also be understood that there may be added to the rubber latex, whether diluted or not, ingredients which tend to prevent coagulation or fermentation, or to vary the viscosity or affect the adhesive quality provided that such ingredients do not adversely affect the capability of coatings of the mixture or compound to respond to pressure in the manner which has been described. The term "rubber latex cement", then, as used in the appended claims is intended to cover any cement the basis of which is water dispersed rubber.

It should be understood that the foregoing exemplifications of the present invention in its application to the specified operations are simply illustrative of various similar applications of the invention involving the principles herein set forth.

The particular method of incorporating sock linings in shoes described in detail, but not claimed, herein is claimed in a co-pending application Serial No. 428,542, filed by me Feb. 14, 1930, as a division of the present case.

The machines, parts of which are shown in the accompanying drawings, form no part of the present invention, that shown in Fig. 5 being shown, described and claimed in application Ser. No. 22,624, filed April 13, 1925, in the name of E. A. Holmgren.

Having thus described my invention, what I claim as new and desire to secure by Letters Patent of the United States is:—

1. The method of causing articles to adhere to one another which comprises coating with rubber latex cement faces of said articles which are to be opposed to each other, allowing the coatings to dry until they are non-tacky and then pressing the coated faces together.

2. The method of causing porous articles to adhere to each other which comprises coating with rubber latex cement faces of said articles which are to be opposed to each other, allowing the articles to stand until the water of the latex has been absorbed and dry non-tacky adherent films of rubber are formed on the coated faces, and then pressing the coated faces together.

3. The method of making heels which comprises coating the faces of lifts with rubber latex cement, allowing the coatings to dry until they are non-tacky, assembling the lifts with the coated faces of the lifts in contact, and subjecting the assembled heel to sufficient pressure to cause the lifts thereof to adhere firmly.

4. The method of making heels which comprises coating the faces of lifts with rubber latex cement, allowing the coatings to dry until they are non-tacky, assembling lifts in the form of a heel blank with coated faces of the lifts in contact, subjecting the heel blank to sufficient pressure to cause the lifts thereof to adhere lightly, and thereafter subjecting the heel blank to pressure sufficient to cause the lifts thereof to adhere firmly.

5. The method of causing hard porous articles to adhere to one another which comprises coating with rubber latex cement faces of said articles which are to be opposed to each other, allowing the coatings to become dry and then pressing the coated faces together with a pressure of at least fifty pounds to the square inch.

6. The method of making heels which comprises coating the faces of the lifts with rubber latex cement, allowing the coatings to dry, assembling the lifts with the coated faces of the lifts in contact and subjecting the assembled lifts to a pressure of at least several tons.

In testimony whereof I have signed my name to this specification.

JAMES CAVANAGH.